Feb. 26, 1946.    R. W. ALLEN    2,395,650
FASTENER CONSTRUCTION
Filed April 25, 1944
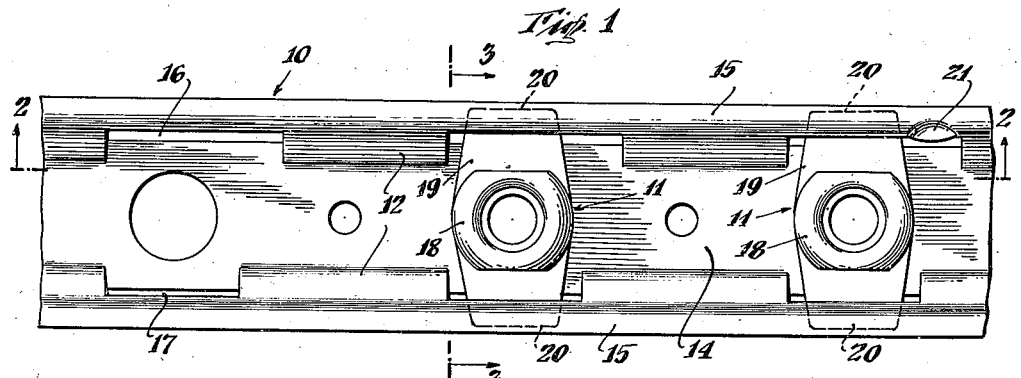
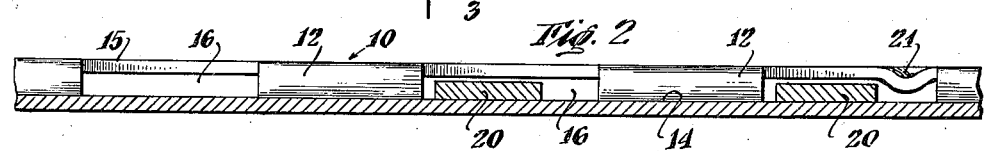
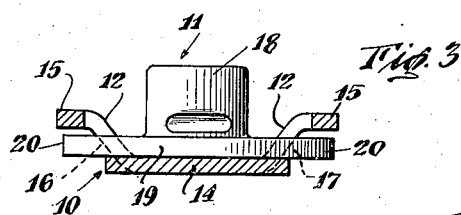
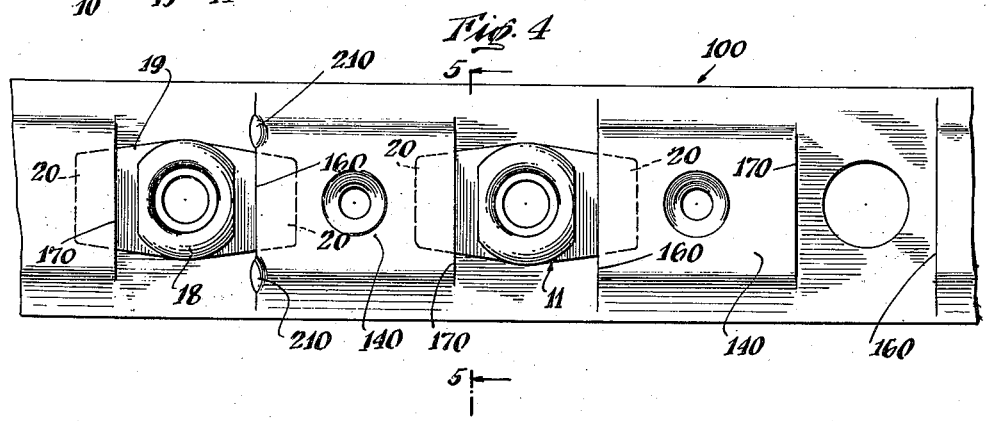
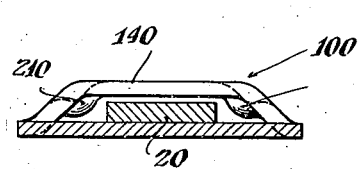
INVENTOR.
Rex W. Allen
BY Duell, Kane & Smart
ATTORNEYS Patented Feb. 26, 1946

2,395,650

UNITED STATES PATENT OFFICE 2,395,650

FASTENER CONSTRUCTION

Rex W. Allen, Palisades, N. Y., assignor to Camloc Fastener Corporation, New York, N. Y., a corporation of New York Application April 25, 1944, Serial No. 532,596

4 Claims. (Cl. 85—32)

This invention relates to improvements in fasteners.

Among the objects of the invention are:

To provide an improved, simplified retainer which will adjustably hold one or more fastener elements;

To provide a retainer for fastener elements, which will provide for lateral and longitudinal adjustability of the fastener elements with respect to the retainer;

To provide a retainer structure in which the fastener elements may be easily inserted, and easily removed;

To provide a low cost, simplified fastener assembly having adequate strength and rigidity.

In the accompanying drawing:

Fig. 1 is a plan view of a retainer, with fastener elements mounted therein;

Fig. 2 is a side elevation, in section on line 2—2 of Fig. 1;

Fig. 3 is an end elevation, in section, on line 3—3 of Fig. 1;

Fig. 4 is a plan view of a second embodiment of the invention; and

Fig. 5 is an end elevation, in section, on line 5—5 of Fig. 4.

Referring to the drawing, one practical embodiment of the invention consists of a retainer or mounting means 10 with which is associated any desired plurality of fastener elements 11.

The retainer 10, see Fig. 3, is desirably a channel, rolled or drawn from a flat strip of metal, to have side walls 12 extending upwardly from a base or web 14, and terminating in preferably horizontal top walls 15.

At locations at which the fastener elements 11 are to be located in the retainer 10, the side walls 12 thereof are pierced or cut and the side wall structure intermediate the transverse end cuts is deformed downwardly to form a widened base portion, as indicated in Fig. 3, at each side of which is an opening through the side wall 12. Desirably, and as shown in Fig. 1, the length of one of the side wall apertures 16, is greater than the opposite side wall aperture 17.

The fastener element 11, illustratively a nut, has a body portion 18 and a base 19 from which extend wings or flanges 20. The maximum width of the fastener element 11, measured from wing to wing, is such that in the Fig. 1 position, the ends of the wings extend through the side wall apertures and are beneath the top walls 15 of the retainer.

The side wall opening 17 is only a little longer than the width of the adjacent wing 20, providing for longitudinal movement of the fastener within the limits of the opening. The opposite side wall opening, 16, is materially in excess of the width of its associated wing 20.

To position the fastener elements 11 within the retainer, the unit is placed on the base thereof, with one of the wings entering, at its corner, the opening 17. Upon rotating the fastener 11 in the plane of the base, the respective wings will pass through the openings, because of the excess length of opening 16.

To retain the fastener wings within the slots, the excess length portion of the slot 16 is deformed downwardly as at 21, see Fig. 2, to give to slot 16 an effective length equivalent to slot 17, and form an abutment which will preclude a disengaging rotation of the fastener elements 11.

When it is desired to remove a fastener element from the retainer 10, the abutment 21 may be lifted, by a screw-driver, or like tool, to permit the disengaging rotation of the fastener element 11.

It will be noted that one end, preferably the left end, of each of the slots 16, 17 is in alignment. In use, a screw or bolt is inserted into the nut 11 from the rear as viewed in Fig. 1, and assuming the nut to be standard right-hand thread, it is apparent that upon making up the screw, the latter will be subject to rotation counterclockwise of Fig. 1. After an initial brief rotation of the nut 11 within the limits afforded by the slots, the sides of the wings 20 of the nut will abut against the solid metal of the walls 12 at the upper left and lower right hand corners as viewed in Fig. 1. Hence, the deformed abutment 21 is not required to resist rotation of the nut 11 except when the screw is being withdrawn from the nut; and in this operation, the loosening of the screw does not result in a forcible rotation of the nut which might cause a wing thereof to ride beneath the abutment 21.

In a second form of the invention, the retainer 100 may be substantially the same channel form as the retainer 10, except that as used, the web 140 is on top, see Fig. 5. In this embodiment, the retainer 100 is transversely cut as at 160, 170, the cut 160 being longer than the cut 170. After the retainer 100 is thus cut, the web and side wall portions of the retainer intermediate the cuts, is flattened, as in a punch press, to form an enlarged flat area at each side of which is an opening through which the wings 20 of the fastener elements 11 may extend. The difference in length of the respective cuts 160, 170, resulting in openings of different length, is for the purpose outlined with respect to cuts 16, 17 of the embodiment of Fig. 1. After the nut 11 has been positioned within the retainer, the metal of the retainer at the ends of the cut 160 is "staked" downwardly, as at 210, 210 to hold the nuts in position.

In each of the described embodiments, the relative dimensioning of the wings 20 with respect to the effective length of the apertures of the retainer through which they extend is such as to permit play laterally and longitudinally of the retainer. It is also desirable to have a limited amount of vertical play, as appears in Figs. 2 and 5.

At the locations of the respective nuts 11 the web of the retainers has an aperture of such dimension that at the maximum extent of adjustment permitted the nut 11 with respect to the retainer, there is a clear passage through the web of the retainer, to the bore of the nut 11.

As shown in Figs. 1 and 4, the retainer may be provided with apertures intermediate the locations of the fastener elements, to accommodate rivets or screws by means of which the retainers may be secured to a plate, sheet, or other structure to which attachment is to be made.

Whereas it is obvious that among others the several objects of the invention as specifically afore noted are achieved, it is apparent that numerous changes in construction and rearrangements of the parts might be resorted to without departing from the spirit of the invention as defined by the claims.

I claim:

1. Fastener structure comprising a retainer having a base and side walls extending angularly outwardly therefrom, said sidewalls having longitudinally extending cuts, the cuts in one sidewall being in register with, and parallel to, the cuts in the opposite side wall, but being longer than such last-named cuts; the portion of each side wall adjacent the base being deformed downwardly throughout the length of the cut therethrough to provide an enlargement of the base of the retainer and elongate openings in registry with the base; a fastener element disposed on said base and having wing portions extending through the respective elongate openings; a wall portion of the retainer intermediate the ends of the longer aperture being deformed adjacent the wing portion extending therethrough to reduce the effective length of the said aperture to approximately the length of the opposite aperture.

2. Fastener structure comprising a channel-form retainer having a web and side walls extending angularly outwardly therefrom, said retainer having spaced, parallel, slots between which the web of the retainer and portions of the side walls merge to provide an enlarged flat surface bounded on two sides by elongate apertures; a fastener element disposed on said flat surface and having wing portions projecting through said apertures; the length of one aperture being slightly greater than the width of the wing portion extending therethrough and the other aperture being materially longer than the width of its associated wing portion; a wall of said longer aperture being struck toward the side edge of said wing portion to limit the effective length of the aperture to substantially that of the opposite aperture.

3. In a multiple fastener structure, the combination of an elongated retainer and a plurality of fastener elements carried thereby in spaced relation, each fastener element including opposed, laterally-extending wing portions which are disposed transversely of the retainer, the retainer comprising a central web and opposed side walls extending angularly outwardly therefrom, each side wall having a longitudinally-extending opening which receives one wing portion of each fastener element, the opposed openings for receiving such wing portions of each fastener element being generally aligned but being of unequal length, the shorter opening being of sufficient length to permit the fastener element to have limited movement therein, the longer opening permitting the opposite wing to be inserted thereinto, a wall portion of the retainer intermediate the ends of such longer opening being deformed adjacent the wing portion therein to reduce the effective length of such opening to approximately the length of the shorter opening.

4. In a multiple fastener structure, the combination of an elongated retainer and a plurality of fastener elements carried thereby in spaced relation, each fastener element having an opening and being provided with opposed, laterally-extending wing portions which are disposed transversely of the retainer, the retainer being stamped from sheet metal and comprising a central web and opposed side walls extending diagonally outwardly and upwardly therefrom, the web having an opening aligned with the opening in each fastener element, each side wall having a longitudinally-extending cut forming an opening which receives one wing portion of each fastener element, the opposed cuts for receiving such wing portions of each fastener element being of unequal length, the portions of the cuts adjacent the central web being deformed downwardly throughout the lengths of such cuts to widen the web in the area of support for the fastener element, the outer marginal edges of such downwardly deformed portions lying inside the outer marginal edges of the side walls, the shorter opening being of sufficient length to permit the fastener element to have limited movement therein, the longer opening permitting the opposite wing to be inserted thereinto, a wall portion of the retainer intermediate the ends of such longer opening being deformed downwardly adjacent the wing portion therein to reduce the effective length of such opening to approximately the length of the shorter opening.

REX W. ALLEN.